United States Patent [19]

Ostre

[11] 4,292,331
[45] Sep. 29, 1981

[54] PROCESS AND COMPOSITION FOR THE PRESERVATION OF VEGETABLES

[75] Inventor: Louis Ostre, Paris, France

[73] Assignee: Ceva, France

[21] Appl. No.: 55,545

[22] Filed: Jul. 9, 1979

Related U.S. Application Data

[63] Continuation-in-part of Ser. No. 824,448, Aug. 15, 1977, abandoned.

[30] Foreign Application Priority Data

Aug. 17, 1976 [FR] France ............................... 76 24943
May 18, 1977 [FR] France ............................... 77 15417

[51] Int. Cl.$^3$ .......................... A23B 7/10; A23K 3/00
[52] U.S. Cl. ........................................ 426/52; 426/53
[58] Field of Search ...................... 426/48, 49, 52, 53, 426/54

[56] References Cited

U.S. PATENT DOCUMENTS

| | | | |
|---|---|---|---|
| 1,807,043 | 5/1931 | Mabee | 426/53 |
| 2,891,869 | 6/1959 | Langlois | 426/48 |
| 2,965,520 | 12/1960 | Snyder et al. | 426/48 X |
| 3,505,073 | 4/1970 | Bode | 426/53 X |
| 3,615,721 | 10/1971 | Silberman | 426/52 |

*Primary Examiner*—Robert A. Yoncoskie

[57] ABSTRACT

A process for stabilizing and preserving harvested vegetables in an acidic environment within a silo. The acidity results from the significant degradation of starch, complex carbohydrates and fermentable carbohydrates. A mixture of bacteria capable of degrading the complex carbohydrates, bacteria capable of causing lactic fermentation of fermentable sugars, and enzymes having a complementary action capable of degrading the complex carbohydrates into fermentable sugars which may be used by the bacteria is used in the process. The bacteria composition may comprise a mixture of fungic amylases, amylases of bacterial origin, amyloglucosidase, and hemicellulase.

15 Claims, No Drawings

PROCESS AND COMPOSITION FOR THE PRESERVATION OF VEGETABLES

This is a continuation-in-part of application Ser. No. 824,448 filed Aug. 15, 1977, now abandoned.

The invention relates to the preservation and stabilization of fresh vegetables so as to render them more appetizing for consumption after harvest. More particularly, the invention concerns a novel ensilaging process for preserving vegetables by using a mixture of specific bacterial strains and specified enzymes placed on an appropriate substrate or support. The invention equally concerns the products of the process as well as the means used for performing the process. The invention applies also to the moist byproducts of the agricultural-nutritional industries.

The problem of vegetable preservation, in particular forage for feeding livestock, is still unsolved; it concerns essentially preserving the forage collected during the harvest period which must then be consumed throughout the rest of the year. An attempt is made to nourish the livestock with feed which still retains its organoleptic qualities, by using vegetables which are as fresh and appetizing as possible throughout the year at prices which permit modest profits.

All vegetable preservation processes are aimed at blocking or destroying the undesired growth of microorganisms normally found on the surface of the vegetables; these proliferations result in the production of enzymes of bacteriological origin, in particular bacteria which carbonate, decompose and alkalize, thus resulting in the putrification of the vegetable, rendering it unappetizing, even toxic to the animal consumption. Treatments with heat, cold or drying are known. However, these treatments are costly.

Ensilaging is a process which makes it possible to preserve the vegetables in a moist and appetizing form at a low cost. Nevertheless, performance of this technique entails a certain number of difficulties resolved by the present invention. Ensilaging is based on the principle of preservation of fresh vegetables for a long or short period in a tightly sealed container, in an acidic environment, so as to prevent the development of destructive, alkalizing and carbonating germs and organisms. Such germs do not survive in an acidic environment. It is difficult to carry out a good ensilaging process because it is hindered by a number of obstacles, the greatest of which is the formation of fermentation products which are dangerous to the health of the animals.

For a better understanding of the principles of good preservation, the various phases subsequent to the harvest of vegetables and then in the silo will be schematically described. As soon as the forage is cut, the enzymes of the plant act upon the carbohydrates and the proteins. These carbohydrates are rapidly and completely transformed into other sugars which serve as principle sources of energy for the microorganisms. A portion of the protein is transformed more slowly up until the amino acid stages. This transformation stops when the pH drops below about 4.5. The plant continues to "breathe" after it is placed in the silo to the extent that the air trapped in the mass of forage contains oxygen. This breathing produces carbon dioxide and water which results in a diminution of the sugars subsequently required for the development of lactic bacteria. It is desirable thus to reduce these effects by the rapid and sealed enclosure in the silo. The microorganisms located on the surface of the green plant develop in the silo and use the juice of the vegetable cells freed as soon as the cells die from a lack of oxygen as nutritive material. During the first hours following placement in the silo, it is the bacteria which need oxygen which develop. They lead to the degradation of the proteins. It is thus important to prevent the growth of germs by a rapid enclosure in the silo. It is then microorganisms which are both aerobic and anaerobic which develop. These microorganisms transform the sugars of the plant principally into acetic acid as well as alcohol, lactic acid and carbon dioxide, thus acidifying the environment. The microorganisms die as soon as the pH of the environment falls below about 5.5. There is no value in having these bacteria develop. The lactic bacteria act thus when the environment is anaerobic. They produce, from the available soluble sugars, or the lactic acid if they are of the homofermentation type, or a little alcohol and acetic acid if they are of the heterofermentation type. These bacteria develop if there is enough sugar available to them; the produce ensilaged thus acidifies rapidly, to reach a pH equal to or less than about 4. It is stabilized, as long as air does not penetrate into the silo, since at these low values of pH in the presence of the air, mold development would still be possible. If the growth of the lacteal bacteria is insufficient, the pH does not drop rapidly enough to 4, and butyric anaerobic bacteria can develop. These bacteria attack the remaining sugars and transform them into butyric and acetic acids as well as carbon dioxide and hydrogen. They likewise attack the lactic acid so as to form the same products. Moreover, these bacteria attack the proteins which they degrade until the ammonia stage or which they transform into amines. These are the principles responsible for the failures encountered when ensilaging.

To overcome this insufficiency of acidity, in particular in the case of vegetables low in fermentable carbohydrates, it is known to effectuate a chemical acidification by the addition of diverse inexpensive acids, in solution, such as formic acid which is most commonly used, as well as a mixture of sulphuric acid and formaldehyde. However, the handling of the acids is not without danger for those who must handle them, as well as being dangerous to the material. This addition of acid is accompanied by a formation of ensilaging juice by plasmolysis, i.e. direct passage of the cellular water towards the outside environment. This juice, which contains large quantities of nutritive substances, highly fermentable, such as soluble carbohydrates, amino acids and vitamins of the B group, flows to the outside and represents a significant loss of dry material; a loss which may go as high as about 3 to 4% of the ensilaged mass. On the other hand, the putrification of these juices is very sickening and constitutes a serious pollution problem which is blamed on the material being ensilaged. The use of acid and formaldehyde reduces the appeal of the ensilaged materials. On the other hand, the distribution of the acid in the midst of the vegetables is not generally done in a homogenous fashion and what happens frequently, in view of the difficulty of mixing, is that the parts of the silo which have not received a sufficient quantity of acid are poorly preserved.

It is likewise known to effect a biological acidification by the addition of very glucidolytic bacteria whose reproduction results in the partial utilization of the vegetable carbohydrates and the progressive acidification of the environment with formation of lactic acid. Nevertheless, this biological acidification, though simple in principle, is sometimes difficult to carry out. In effect, numerous obstacles prevent the achievement of a good ensilaging process: choice of strains, speed of their culture, bacterial antagonisms resulting in the reciprocal neutralization of the bacteria, and growth of undesirable bacteria carried by the vegetables. The bacteria proposed by the prior art are almost always those of the milk industry. Such bacteria do not normally grow at ordinary temperatures in environments which are free of milk or milk by-product as is described by French Pat. No. 1,534,166. The direct seeding of the lacteal bacteria in the product to be ensilaged cannot be successful except under complex conditions of physical and chemical reactions previously described and as a function of the conditions of the environment, essentially pH, temperature and the presence of oxygen. Moreover, these baceria use essentially lactose and only rarely maltose and never starch or cellulose.

Processes have also been described in which a raw material, rich in carbohydrates, is added to the silo. Such materials may, for example, be molasses or dehydrated beet pulps. These materials serve to furnish carbohydrates to the lacteal bacteria. The results obtained are irregular because only relatively little carbohydrates present, particularly saccharose, are used by the natural lacteal bacteria. This contribution has no effect on the selection of bacteria and more precisely causes an increase in the level of dry material which is a factor favoring the growth of butyric bacteria. The incorporation of these substances is difficult, even impossible if a specially adapted apparatus is not used. The dehydrated pulps are very costly for a correspondingly low nutritional yield. Such a process is described in German Pat. No. 1,492,903. It consists essentially of adding a mixture of barley and malt to the ensilage environment. This process depends critically on the diastatic or enzymic properties of the malt which are variable and can only be controlled with difficulty. On the other hand, this action is slow at ordinary temperatures and great quantities of barley, the source of the starch, are necessary. Further, their incorporation into the ensilaging environment is very costly and difficult to carry out. The final transformation yield of the starch into lactic acid is low and the action occurs very slowly.

Thus, in the presently known ensilaging techniques, only the soluble sugars, contained in the vegetables, are used in the production of lactic acid. When dealing with vegetables low in carbohydrates, especially of the legume type, the ensilaging is practically impossible to carry out under good conditions since the lactic bacteria do not have sufficient nutrition to multiply. As a result, the environment is insufficiently acidified and toxic products result which rapidly render the forage unsuitable for consumption.

The novel process according to the invention makes it possible to obtain a lactic fermentation without other undesirable biological reactions by creating conditions which are indispensable to a lactic fermentation, i.e. provision of nutritive elements necessary for the growth of lactic bacteria. With the process, no outside elements are necessary and undesirable bacteria need not be destroyed. This process is applicable to fresh fruits, all different kinds of vegetables, as well as various varieties which have in the past been difficult to treat, such as, for example: cabbage, alfalfa and beets.

The present invention relates to an improvement for the stabilization of vegetables by acidification which not only may be used with all different types of vegetables but actually improves their nutritive value. Moreover, the process according to the invention makes it possible to completely restrain all butyric fermentation, to extend the period during which preservation is possible, which is made entirely independent of the temperature, and to improve to a great extent the utilization of the vegetable nitrogen by the animals.

The novel process, according to the invention, comprises the addition to the forage or other vegetable material to be ensilaged of at least one bacterial strain capable of producing lactic acid from the fermentable sugars present. The process is characterized in that an agent which degrades the higher carbohydrates into fermentable sugars is added at the same time as the bacteria.

Thus, according to the invention, the higher carbohydrates such as, for example, cellulose, pentosan, starch, etc. present in the stored vegetables are transformed into sugars so as to be available for the bacteria performing the bacterial fermentation. The level of bacteria can thus not be too low and the level of fermentable sugars of the vegetable is not diminished.

One way of performing the novel process according to the invention consists of introducing at least two types of bacteria to the material being ensilaged during the ensilaging process. One type of bacteria is chosen among those which are capable of degrading the higher carbohydrates into fermentable sugars. The other type of bacteria used is capable of transforming these fermentable sugars into lactic acid.

More particularly, the additives to these vegetables or forage according to the invention comprise at least one microbial strain capable of degrading the starch into maltose and at least one second microbial strain for transforming the maltose into lactic acid.

Thus, contrary to the prior art, the present invention makes it possible to provide the microorganisms which produce the lactic acid with sufficient quantities of fermentable sugars for this lacteal production irrespective of the type of vegetable material being treated. As a result, there is sufficient maltose such that the formation of lactic acid can take place up to a pH below about 4.5. This formation is accelerated when enzymes for degrading the higher carbohydrates are added.

In an optional but preferred embodiment of the invention, one or several enzymes having a complementary action capable of breaking down the carbohydrates, and in particular cellulose, starch, pentosanes, etc., into fermentable sugars are added to the forage. More particularly, the hemi-cellulase, the amylases and the amyloglucosidases are often used in this respect for assuring the formation of maltose which is necessary for the production of lactic acid by the bacteria. The term hemi-cellulase is used to designate a hemicellolytic complex of fungic origin having a sacchariifying enzymatic action of the galactomanase, pectinase, beta glucanase, xylanase and cellulase type. It acts on the carbohydrate constituents of the cellular membranes and the dextrins in the pH range between 2 and about 5.5. The amylases may be of different types and origins. The $\alpha$ and $\beta$ amylases of fungic origin hydrolyze the (1-4)-$\alpha$ bonds of the starches to form principally maltose but also trioses and limited dextrins (polymers containing 5 to 8 ose molecules). The (1-6)-$\alpha$ bonds are not broken by this amylase. This amylase acts on the starch of broken starch grains. In effect, the periphery of the starch grain is formed of a membrane constituted by pentosanes and higher carbohydrates not attacked by a α or β-amylase. Furthermore, it acts in a pH range between about 4 and 6.4. Its action thus stops when the pH of the silo drops below about 4.

To complement the hydrolyzing action of this fungic amylase, an amylase of bacterial origin was added to the preparation to be preserved, this addition forming a part of the invention. This enzyme acts on the liquefied starches by virtue of the action of the preceding amylases and produces essentially maltose. This enzyme acts in a pH range between about 5 and about 8.

To break the 1–6 bonds not attacked by the preceding enzymes, a third amylotic enzyme was added to the produce to be ensilaged. This enzyme addition also forms an object of the invention. The enzyme, an amyloglucosidase which is an enzymatic saccharifying complex, acts as a hydrolysis catalyst of (1–4)-α and expecially the (1–6)-α bonds of the end chains of the starch; producing essentially d-glucose from the limited dextrins. This amylase acts at a pH between about 3 and 6.8. These enzymes which are used in admixture thus have a complementary action due to their action on the carbohydrates from the most complex to the simplest, in pH ranges from 2 to 7. The maximum activity for each enzyme is related in proportion to the lowering of the pH which does not go below 3.5 in the silo and to the temperature intervals varying between 10° and 30° C. which are compatable with the conditions of the silo.

As a result of the invention, lactic acid is produced to the detriment of the higher carbohydrates instead of the lower sugars which are of high nutritive value. This transformation of complex carbohydrates into assimilable and fermentable sugars increases the nutritive value of the ensilaged vegetable. It thus makes it possible to obtain the best zootechnical results by direct use of these latter sugars or at least by the activation of rumen bacteria, to which these sugars bring supplemental energy.

The strains of bacteria utilized according to the invention each have the following common characteristics: they can all ferment glucose, VP (Vôges-Proskaver) reagent and oxydase while they have no action on inositol, sorbitol, urea, citrate and they do not produce $H_2S$. The degradation bacteria are characterized by fermenting starch but not maltose. Additionally it has been found that gram negative bacterial which are starch+ and maltose- are very suitable as degradation bacteria. The gram-bacteria are Enterobacteriacees; particularly suitable are Erwinia or Pectobacterium, group Herbicola, named *Enterobacter agglomerans*.

Even though it is possible to utilize mixtures chosen from among numerous known microorganisms, when the principle of the invention described above is used in conjunction with certain Gram+ bacteria, in particular cocci and bacilli produce particularly good results. The following table gives the characteristics of such bacteria.

TABLE 1

|  | Cocci Gram + | | | Bacillus Gram + | | | |
| --- | --- | --- | --- | --- | --- | --- | --- |
|  | 1 | 2 | 3 | 4 | 5 | 6 | 7 |
| Glucose | + | + | + | + | + | + | + |
| Mannitol | − | + | + | − | + | + | + |
| Inositol | − | − | − | − | − | − | − |
| Sorbitol | − | − | − | − | − | − | − |
| Rhamnose | − | + | + | − | + | + | + |
| Saccharose (sucrose) | + | − | + | − | + | + | + |
| Melibiose | − | + | + | − | + | − | − |
| Amygdaline | + | + | + | − | + | + | + |

TABLE 1-continued

|  | Cocci Gram + | | | Bacillus Gram + | | | |
| --- | --- | --- | --- | --- | --- | --- | --- |
|  | 1 | 2 | 3 | 4 | 5 | 6 | 7 |
| Arabinose | − | + | + | − | + | + | + |
| Maltose | + | + | + | + | − | + | − |
| Starch | − | − | − | − | + | − | + |
| Gelatine | − | − | − | − | + | − | − |
| Catalase | − | − | − | − | + | + | + |
| O N P G (B galactosidase) | − | + | − | − | + | + | + |
| A D H (arginine dihydrolase) | − | − | + | − | − | − | + |
| L D C (lysine decarboxylase) | − | − | − | − | − | − | − |
| T D A (tryptophane desaminase) | − | − | − | − | − | − | − |
| Citrate | − | − | − | − | − | − | − |
| $H_2S$ | − | − | − | − | − | − | − |
| Urea | − | − | − | − | − | − | − |
| Indole | − | − | − | − | − | − | − |
| VP (Voges Proskauer) | + | + | + | + | + | + | + |
| Nitrates | − | − | − | − | + | + | + |
| Oxydase | + | + | + | + | + | + | + |

It can be seen from the characteristics of the preceding table that the two types of bacteria employed act in a manner so as to complement one another. Thus the cocci (numbers 1 to 3) ferment the majority of the simple carbohydrates and in particular the glucose, sucrose and maltose. They thus proliferate as long as these sugars are present in the forage which results in the formation of lactic acid and a rapid drop of pH towards 4.5 and consequently a complete stop of the butyric fermentation. Yet, this proliferation of cocci will result in a significant drop of the quantity of simple sugars indicated above. On the other hand, the starch present in the vegetables will remain unused by virtue of the inability of cocci to attack it. Nevertheless, the proliferation of bacilli (numbers 5 and 7) intervene and break down the starch into sugars which may be assimilated by other bacteria of the same group (numbers 4 and 6), providing a synergistic result.

The bacteria used in the process of the invention may be cultivated by classical techniques on agar with a nutritive medium comprising cereal flours. Bacteria which may be used are for example Streptococcus lactis, Lactobacillus plantarum, Leuconostoc mesenteroides (Betacoccus) and the like.

The amounts of the supported mixture of the bacteria in question which are used per ton of the particulated or shred forage is approximately 10 to 15 kg. This dry mixture comprises on the whole order of about 100,000 to about 1 million cocci and about 100,000 to about 1 million bacillus per gram. By the time the pH reaches about 3.8 to 4.2 in the ensilaged material, seeded with its bacteria, the number of living germs per gram of material is on the order of $10^9$.

Tests were run in silos of 4 cubic meter capacity on dactilis Lucifer harvested in June in the beginning of the heading of the grain. This forage was finally divided and stored under three different conditions:

(A) with no treatment (B) treated with 3 liters of formic acid per cubic meter in the conventional manner; and (C) with the addition of 7 kg of the culture of 7 bacteria on substrates whose characteristics are indicated above (numbers 1 t 7).

(D) with the mixture of C to which gram-bacteria of the family of Enterobacteriaceae of the genera Erwinia or Pectobacterium of the group Herbicola named Enterobacter agglomerans. Dose added $10^5$ to $10^6$ organisms per gram: 10 kg per ton of fodder.

After 90 to 120 days, analysis of the three ensilaged materials led to the results shown in Table II.

It can be seen that the treatment according to the invention led to the lowest pH and to the strongest level of lactic acid. It has the advantage of yielding neither propionic nor butyric acid and only approximately half of the acetic acid which is formed by other processes.

TABLE II

| | pH | Nitrogen of $NH_3$ % of Total N | N Soluble % of Total N | Organic acids and alcohols g/kg MS | | | | |
|---|---|---|---|---|---|---|---|---|
| | | | | Lactic | Acetic | Propionic | Butyric | Alcohols |
| A. non-treated | 4.34 | 14.1 | 49.8 | 77.6 | 29.1 | 2.5 | 0 | 7.8 |
| B. Formic acid treatment | 4.05 | 7.7 | 42.7 | 69.9 | 25.3 | 0.8 | 0 | 6.7 |
| C. Treatment according to the invention | 4.02 | 7.7 | 48.1 | 95.0 | 14.7 | 0 | 0 | 11.0 |
| D. Treatment according to the invention (C + strain gram-Enterobacteriaceae) | 3.70 | 8 | 44 | 112 | 0 | 18.28 | 0 | 12 |

The digestibility and ingestibility of these ensilaged materials was measured on sheep. The results are:
(B) treatment with formic acid: 0.64 UF/kg
(C) treatment according to C: 0.74 UF/kg
(D) treatment according to D: 0.82 UF/kg The nitrogen levels in growing animals also illustrates the advantages of the treatment according to the invention as may be seen from Table III.

TABLE III

| | N ingested g/d | Fecal N | | Urinary N | | N retained | |
|---|---|---|---|---|---|---|---|
| | | g/d | % N ingested | g/d | % N ingested | g/d | % N ingested |
| A: not treated | 20.3 | 7.45 | 36.8 | 12.70 | 62.7 | 0.12 | 0.6 |
| B: formic acid treatment | 18.7 | 7.16 | 38.3 | 10.50 | 56.4 | 1.02 | 5.5 |
| C: treatment of the invention | 16.7 | 6.28 | 37.7 | 8.24 | 49.5 | 2.14 | 12.8 |
| D: treatment according to the invention | 16.5 | 5.4 | 38.8 | 7.70 | 47 | 2.40 | 14.5 |

The mixture according to C results in an improvement in retained nitrogen. This improvement is increased by treatment D.

Thus, the nitrogen retained is more than double that obtained by the formic acid treatment.

To prepare a composition comprising both bacteria and enzymes, the necessary bacteria deposited on a support as indicated hereinabove may be mixed with a mixture of the enzymes according to the invention. A preferred embodiment of the invention comprises adding the enzymes, themselves supported on a cereal (wheat, barley, sprouted barley) preferably in a finely ground form. The starch contained in the support is thus added to the starch and the carbohydrates contained in the vegetables; it is degraded into fermentable sugars. As a result, the nutritive value of the ensilaged material is increased.

The composition of the supported bacteria mixture and the mixture of enzymes deposited or not on the cereal support may comprise different proportions of each of the constituents. This dry mixture contains a quantity on the order of 100,000 to 1 million cocci and 100,000 to 1 million bacilli per gram.

The quantities of hemicellulase, amylase and amyloglucosidase may be varied as a function of the nature of the forage to be treated. However, these proportions are in general between about 0.05% and about 0.20% by weight of the vegetable ensilaged or about 35,000 U.I/g of hemicellulase; between about 0.5% and about 0.20% or about 250 units of bacterial amylase per gram; between about 0.10 and about 0.20% or about 50,000 units of PS 50/ of fungic amylase per gram; and between about 0.10 and about 0.70% or about 200 units AG per gram of amyloglucosidase.

When the enzymes are deposited on a support of cereals according to a preferred form of the invention, the product to be incorporated into the ensilage may contain about 1 kg. of enzymes per 9 kg. of support.

The quantities of bacteria and enzymes supported are approximately 10 to 15 kg. per ton of forage.

Tests were performed prior to the introduction of the bacteria-enzyme supported mixture into the silo to show the action of the enzymes on the raw starch.

1000 grams of hammer ground barley flour are mixed with the enzyme to be studied (the percentage being indicated in Tables IV and V) and 100 mg. of zisasan as antibiotic. 100 grams of soft water (22 T.H.) at ambient temperature are then added to obtain a relatively consistant paste.

After 72 hours (for the tests of the first series) and 56 hours (for the tests of the second series) at ambient temperature, the paste (which initially has a pH of 5.3) is dispersed in distilled water to obtain a volume of 500 ml. The dispersion is filtered and the filtrate is tested for the level of reducing sugars as well as glucose.

In the course of these tests, a physical modification of the paste takes place. The amyloglucosidase causes the paste to become very fluid, the bacterial α-amylase causes it to become fluid and it is slightly modified with respect to the control with the fungic amylase.

TABLE IV

| | 1st series of runs: 72 hours | | | |
|---|---|---|---|---|
| | % enzyme | pH at the end of run | % of reducing sugars into glucose | % of real glucose |
| Control | — | 5.40 | 8.6 | 4.3 |
| Fungic Amylase | 2 | 4.55 | 12.6 | 7.1 |
| Bacterial Amylase | 1 | 5.30 | 16.7 | 6.6 |
| Bacterial Amylase + fungic Amylase | 1 | 4.60 | 19.2 | 10.8 |
| Amyloglucosidase | 1 | 5.20 | 29.3 | 12.7 |

TABLE V

| | 2nd series of runs : 56 hours | | | |
|---|---|---|---|---|
| | % enzyme | pH at the end of the run | % of reducing sugars in the glucose | real glucose |
| Control | — | 5.30 | 8.4 | 4.3 |
| Fungic amylase | 0.2 | 5.30 | 10.0 | 5.2 |
| Bacterial amylase | 0.1 | 5.35 | 14.1 | 6.2 |
| Amyloglucosidase | 0.1 | 5.25 | 18.8 | 12.8 |
| Bacterial and fungic amylase + hemicellulase + amyloglucosidase | 0.1 | 5.25 | 21.35 | 19.49 |

These tables make it possible to compare the individual activity of each enzyme on the raw starch, as well as the complementary and the synergistic action of the four enzymes. Likewise, the yields of reducing sugars and real glucose are greater with the amyloglucosidase because it is able to break the (1-6)-α bonds.

Tests were conducted on cabbage; the culture added bacteria being accompanied by a small addition of α- and β-amylase of fungic origin and hemicellulase. Under these conditions, a marked reduction of the level of raw cellulose in the material ensilaged according to the invention was noted as may be seen from Table VI below.

TABLE VI

| | A Not treated | B formic treatment | C treated according to the invention |
|---|---|---|---|
| Water | 92.67 | 88.22 | 91.26 |
| Mineral materials | 1.37 | 1.19 | 1.44 |
| Raw Proteins | 2.07 | 2.80 | 1.94 |
| Raw Cellulose | 1.72 | 1.66 | 1.02 |
| Ammoniacal nitrogen | 0.095 | 0.074 | 0.055 |
| $NH_3/N$ ratio | 28.8 | 16.5 | 17.7 |
| Lactic acid | 0.06 | 0.08 | 1.74 |
| Butyric acid | 0.02 | 0.007 | absent |
| Propionic acid | 0.09 | 0.06 | absent |
| Acetic acid | 0.21 | 0.50 | 0.23 |
| pH | 5.30 | 4.55 | 3.95 |

Tests were run in silos of 4 cubic meter capacity on alfalfa harvested in June. This forage was finely divided and stored under the following conditions:

(A) treated with 3 liters/m³ of formic acid in the known manner.

(B) the addition of 7 kg. of a mixture constituted by 7 bacteria on a substrate whose characteristics are described hereinabove and the following enzymes:

amylases of fungic origin, amylases of bacterial origin, amyloglucosidase and hemicellulase, deposited on a substrate of finely divided barley in the proportions previously indicated.

After 90 to 120 days, the two ensilages yielded the results shown in Table VII.

It can be seen that the treatment following the invention leads to the lowest pH and to the highest level of lactic acid. It further has the advantage of resulting in the formation of neither propionic nor butyric acid.

TABLE VII

| | Silo treated with Formic acid | Silo treated according to the invention |
|---|---|---|
| % dry matter | 23.70 | 24.08 |
| pH | 4.20 | 3.80 |
| $NH_3$/Total N | 8.02 | 6.67 |
| Total N | 6.36 | 6.30 |
| Ammoniacal N | 0.51 | 0.42 |
| Acetic acid | 6.08 | 5.92 |
| Propionic acid | trace amounts | trace amounts |
| Butyric acid | 1.62 | trace amounts |
| Lactic acid | 18.60 | 25.50 |

Table VIII which follows below lists the characteristics of the two groups of Gram positive bacteria Bacillus B8 to B14 and Streptococcus S4 to S7 which may be used in the invention. These bacteria were isolated from a barley flour by means of UF gelose method in long and narrow tubes with isolation by exhaustion as well as by the method of anaerobiosis in a Petri jar on agar (see Table VIII).

TABLE VIII

| | | Bacillus | | | | | | | Streptococcus | | | |
|---|---|---|---|---|---|---|---|---|---|---|---|---|
| | | B8 | B9 | B10 | B11 | B12 | B13 | B14 | S4 | S5 | S6 | S7 |
| sugars | glucose | + | + | + | + | + | + | + | + | + | + | + |
| | mannitol | — | — | + | + | + | + | + | + | + | — | — |
| | inositol | — | — | — | — | — | — | — | — | — | — | — |
| | sorbitol | — | — | — | — | — | — | — | + | + | — | — |
| | rhamnose | — | — | + | + | + | + | + | + | + | — | — |
| | saccharose | — | — | + | + | — | + | + | + | — | + | + |
| | melibiose | — | — | + | + | — | + | — | + | + | — | — |

TABLE VIII-continued

| | | Bacillus | | | | | | | Streptococcus | | | |
|---|---|---|---|---|---|---|---|---|---|---|---|---|
| | | B8 | B9 | B10 | B11 | B12 | B13 | B14 | S4 | S5 | S6 | S7 |
| enzymatic agents | amygdaline | − | − | + | + | + | + | + | + | + | + | + |
| | arabinose | − | − | + | + | + | + | + | + | + | − | − |
| | gelatine | − | − | + | + | − | − | − | − | − | − | − |
| | catalase | − | − | + | + | + | + | + | − | − | − | − |
| | C N P G | − | − | + | + | + | + | + | − | + | − | − |
| | A D H | − | − | − | − | − | + | + | + | − | − | − |
| | L D C | − | − | − | − | − | − | − | − | − | − | − |
| | O D C | − | − | − | − | − | − | − | − | − | − | − |
| | T D A | − | − | − | − | − | − | − | − | − | − | − |
| | Citrate | − | − | − | − | − | − | − | − | − | − | − |
| | H₂S | − | − | − | − | − | − | − | − | − | − | − |
| | urea | − | − | − | − | − | − | − | − | − | − | − |
| | indole | − | − | − | − | − | − | − | − | − | − | − |
| | V.P. | + | + | + | + | + | + | + | + | + | + | + |
| | nitrates | − | − | + | + | + | + | + | + | − | − | − |
| | oxydase | + | + | + | + | + | + | + | + | + | + | + |

The bacilli B8 and B9 are Lactobacillus plantarum; B10 and B11 are long bacilli, B12 are very long, while B13 and B14 are squat. Streptococcus S4 is a special coccus different from the others, S5 is a lactic Streptococcus, while S6 and S7 which both have identical biochemical reactions, are in the form of very fine colonies and differ from one another in that Strepto S6 appears under the gram in the form of short chains, while the S7 forms little packs having thick shells.

By culturing these strains, one obtains the products which according to the invention are to be mixed with the forage when it is being put in the silo. Even though the culture may be accomplished by any of the known techniques, it is preferable to carry it out in the following fashion.

For the bacilli, slightly packed environment, pH 6 to 7.5 which is relatively rich in proteins, for example, in grams/liter:

| | |
|---|---|
| Amino extract of beer yeast | 10 |
| Pancreatic peptone or casein | 1.25 |
| Chapoteaut peptone | 10 |
| glucose | 4 |
| NaCl | 5 |
| Creamed milk | 5 |

The environment must, on the contrary, be tightly buffered at a pH of about 7-7.2. It may be constituted by an ordinary glucose broth such as, for example (in grams/liter):

| | |
|---|---|
| Amino extract of beer yeast | 3.75 |
| pancreatic peptone | 1.25 |
| Chapoteaut peptone | 10 |
| NaCl | 5 |
| glucose | 4 |
| monopotassium phosphate | 0.7 |
| disodium phosphate | 8.3 |

The cultures obtained are preferably used in the dry state and in particular in the freeze dried state.

The invention has been described with reference to particular bacteria, enzymes and forages. It should be understood however that the invention is not limited to the specific materials disclosed but encompasses instead all alternatives, substitutes and modifications falling within the invention as defined by the claims.

I claim:

1. In the process of ensilaging vegetables by lactic acidification comprising addition of sufficient bacteria causing lactic fermentation thereof to raise the pH to below about 4.5, the improvement which comprises additionally adding to said vegetables an agent which is capable of degrading higher carbohydrates into fermentable sugars usable by said lactic bacteria in an amount sufficient to produce sufficient fermentable sugars to realize said pH by said lactic fermentation, said agent being Enterobacteriacees bacteria capable of fermenting starch but not capable of fermenting maltose.

2. Process of claim 1 wherein said agent is capable of fermenting glucose, Voges-Proskaver reagent and oxydase while having no effect on inositol sorbitol, citrate and urea and not resulting in the formation of H₂S.

3. Process of claim 1 wherein said agent is disposed on a substrate; the amount of said agent culture and substrate in the dry state added per ton of vegetables to be ensilaged being between 10 and 15 kg., each gram of said culture-substrate mixture containing between 100,000 and 1,000,000 living germs per gram.

4. Process of claim 1 wherein said agent is genera of Erwinia or Pectobacterium, group Herbicola, named Enterobacter agglomerans.

5. Process of claim 1 wherein said agent is obtained by culturing in a nutritive medium of cereals.

6. Process of claim 1 wherein said agent is employed in combination with at least one enzyme having a complimentary action with said agent in a amount sufficient to accelerate the degradation of carbohydrates by said agent.

7. Process of claim 6 wherein said enzyme is disposed on a cereal substrate.

8. Process of claim 7 wherein the enzyme is disposed on the cereal in a ratio of approximately 1 kg. of enzyme per 9 kg. of substrate.

9. Process of claim 6, wherein the enzyme is chosen from the group consisting of fungic amylase, bacerial hemicellulase, amyloglucosidase and mixtures thereof.

10. Process of claim 9 wherein the enzyme is hemicellulase and is added in amounts of between 0.05 to 0.20 per thousand by weight and has an activity of approximately 35,000 U.I./g.

11. Process of claim 9 wherein the enzyme is amyloglucosidase and is added in an amount of 0.10 to 0.70 per thousand by weight and has an activity of 200 units AG/gram.

12. Process of claim 9 wherein said enzyme is disposed on a cereal substrate.

13. Process of claim 6 wherein the enzyme is bacterial amylase and is added in amounts of 0.05 to 0.20 per thousand by weight of the material to be ensilaged and has an activity of 250 units/gram.

14. Process of claim 6 wherein the enzyme is fungic amylase and is added in amounts of 0.10 to 0.20 per thousand by weight of the material to be ensilaged and has an activity of 50,000 units PS 50/gram.

15. Process of claim 7 wherein the bacteria causing the lactic fermentation are added in combination with and at the same time with said agent and said enzymes.

* * * * *